(12) United States Patent
Maeda et al.

(10) Patent No.: US 11,104,100 B1
(45) Date of Patent: Aug. 31, 2021

(54) RESIN SHEET HAVING HAIR-LIKE BODIES, AND MOLDED ARTICLE OF RESIN SHEET HAVING HAIR-LIKE BODIES

(71) Applicant: DENKA COMPANY LIMITED, Tokyo (JP)

(72) Inventors: Keishi Maeda, Gunma (JP); Hiroko Toyama, Gunma (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 17/253,362

(22) PCT Filed: Dec. 3, 2019

(86) PCT No.: PCT/JP2019/047244
§ 371 (c)(1),
(2) Date: Dec. 17, 2020

(87) PCT Pub. No.: WO2020/116453
PCT Pub. Date: Jun. 11, 2020

(30) Foreign Application Priority Data

Dec. 4, 2018 (JP) .............................. JP2018-227048

(51) Int. Cl.
*B32B 5/12* (2006.01)
*B32B 27/32* (2006.01)
(Continued)

(52) U.S. Cl.
CPC .............. *B32B 5/12* (2013.01); *B29C 51/004* (2013.01); *B29C 51/10* (2013.01); *B29C 51/145* (2013.01);
(Continued)

(58) Field of Classification Search
CPC ....... B29C 51/004; B29C 51/145; B32B 3/30; B32B 5/12; B32B 7/03
See application file for complete search history.

(56) References Cited

U.S. PATENT DOCUMENTS 7,070,727 B2 * 7/2006 Calhoun ................ D04H 11/08
264/167
7,169,457 B2 1/2007 Suto et al.
(Continued)

FOREIGN PATENT DOCUMENTS

CN 101817249 A 9/2010
CN 103154134 A 6/2013
(Continued)

OTHER PUBLICATIONS

International Search Report for International Application No. PCT/JP2019/047244 dated Jan. 28, 2020.
(Continued)

*Primary Examiner* — Zachary M Davis
(74) *Attorney, Agent, or Firm* — Pearne & Gordon LLP

(57) ABSTRACT

[Problem] The objective of the present invention is to provide a resin sheet that has a favorable tactile sensation and no less than a certain light transmittance and a molded article thereof.

[Solution] A resin sheet that has hair-like bodies arranged regularly on at least one surface of an underlayer and in which a continuous phase is formed without any structural boundary between the underlayer and the hair-like bodies, wherein the average height of the hair-like bodies is no less than 30 μm and no greater than 500 μm, the total light transmittance of the resin sheet measured in accordance with JIS K 7136-1 is no less than 0.1% and no greater than 20%, and the contrast ratio of the resin sheet measured in accordance with JIS K 5600 4-1 is no less than 70% and no greater than 98%.

7 Claims, 4 Drawing Sheets

(51) Int. Cl.
- B32B 27/40 (2006.01)
- B29C 51/14 (2006.01)
- B29C 51/00 (2006.01)
- B29C 51/10 (2006.01)
- B32B 27/12 (2006.01)
- B29K 75/00 (2006.01)
- B29K 101/12 (2006.01)
- B29L 31/30 (2006.01)
- B29L 31/34 (2006.01)
- B29L 31/00 (2006.01)

(52) U.S. Cl.
CPC ............ *B32B 27/12* (2013.01); *B32B 27/32* (2013.01); *B32B 27/40* (2013.01); *B29K 2075/00* (2013.01); *B29K 2101/12* (2013.01); *B29L 2031/3005* (2013.01); *B29L 2031/34* (2013.01); *B29L 2031/712* (2013.01); *B32B 2262/0215* (2013.01); *B32B 2274/00* (2013.01); *B32B 2307/414* (2013.01); *B32B 2307/732* (2013.01); *B32B 2439/40* (2013.01); *B32B 2457/00* (2013.01); *B32B 2605/003* (2013.01)

(56) References Cited

U.S. PATENT DOCUMENTS

| | | |
|---|---|---|
| 8,038,830 B2 | 10/2011 | Suto et al. |
| 8,137,789 B2 | 3/2012 | Suto et al. |
| 2004/0062913 A1 | 4/2004 | Suto et al. |
| 2007/0009711 A1 | 1/2007 | Suto et al. |
| 2008/0305300 A1 | 12/2008 | Suth et al. |
| 2010/0101722 A1 | 4/2010 | Suto et al. |
| 2013/0202827 A1 | 8/2013 | Yokogi et al. |
| 2019/0283301 A1 | 9/2019 | Fujiwara et al. |

FOREIGN PATENT DOCUMENTS

| | | |
|---|---|---|
| EP | 3431284 A1 | 1/2019 |
| JP | S5620669 A | 2/1981 |
| JP | 2003071956 A | 3/2003 |
| JP | 2004115972 A | 4/2004 |
| JP | 2015161052 A | 9/2015 |
| JP | 6731568 B1 | 7/2020 |
| WO | 2017159678 A1 | 9/2017 |
| WO | 2018016562 A1 | 1/2018 |

OTHER PUBLICATIONS

Decision to Grant a Patent for Japanese Patent Application No. 2020-518735 dated Jun. 19, 2020 (English translation included).

* cited by examiner

RESIN SHEET HAVING HAIR-LIKE BODIES, AND MOLDED ARTICLE OF RESIN SHEET HAVING HAIR-LIKE BODIES

TECHNICAL FIELD

The present invention pertains to a resin sheet having hair-like bodies and a molded article thereof.

BACKGROUND ART

Conventionally, sheets of paper and polymer materials are used as interior materials of automobiles and the housings of associated components, housings of electronic devices and appliances, building materials such as wallpaper, housings for toys and game consoles, and members of daily necessities. Further, as a method to provide a good tactile sensation to a surface of a sheet, Patent Document 1, for example, presents a resin sheet having hair-like bodies arranged regularly on a surface.

Meanwhile, the provision of a resin sheet having a favorable surface texture and no less than a certain light transmittance in order to perform optical presentation in a space such as, for example, an automobile interior is desired. For example, while there are sheets in which a minute punching process or an embossing process has been performed on synthetic leather so as to have a certain light transmittance (Patent Documents 2 and 3), light is transmitted only at portions at which holes have been opened or portions that have been thinned by the embossing process, so not only is sufficient light transmittance not obtained, but there are problems such as a hole-opening process or embossing process becoming necessary in addition to the manufacture of the synthetic leather sheet and the manufacturing process becoming complicated.

Patent Document 1: WO 2018/016562 A
Patent Document 2: JP 2003-71956 A
Patent Document 3: JP 2015-161052 A

SUMMARY OF INVENTION

Technical Problem

The objective of the present invention is to provide a resin sheet having a favorable tactile sensation and no less than a certain light transmittance and a molded article thereof.

Solution to Problem

That is, as the result of investigation by various means, the present inventors discovered that a resin sheet having regularly arranged hair-like bodies can be used as skin material, etc. suited to optical presentation by adjusting the total light transmittance and the contrast ratio in certain ranges, arriving at the present invention.

The present invention, which solves the abovementioned problem, is configured as follows.

(1) A resin sheet that has hair-like bodies arranged regularly on at least one surface of an underlayer and in which a continuous phase is formed without any structural boundary between the underlayer and the hair-like bodies, wherein the average height of the hair-like bodies is no less than 30 μm and no greater than 500 μm, the total light transmittance of the resin sheet measured in accordance with JIS K 7136-1 is no less than 0.1% and no greater than 20%, and the contrast ratio measured in accordance with JIS K 5600 4-1 is no less than 70% and no greater than 98%.

(2) The resin sheet described in (1), wherein the average diameter of the hair-like bodies is no less than 1 μm and no greater than 50 μm and the average spacing between the hair-like bodies is no less than 20 μm and no greater than 200 μm.

(3) The resin sheet described in (1) or (2), wherein the underlayer and the hair-like bodies have a thermoplastic resin as a main component and the thermoplastic resin comprises an olefin-based resin.

(4) The resin sheet described in any one of (1) to (3), wherein the underlayer and the hair-like bodies have a thermoplastic resin as a main component and the thermoplastic resin comprises a urethane-based elastomer.

(5) The resin sheet described in any one of (1) to (4), wherein the resin sheet is a multilayer resin sheet.

(6) A molded article formed by using the resin sheet described in any one of (1) to (5).

(7) The molded article described in (6), wherein the molded article is vacuum-pressure molded on a surface of an automobile interior member, an electronic device, an electronic device cladding, a cosmetic container, or a container member.

Effects of Invention

According to the present invention, a sheet having a favorable tactile sensation and no less than a certain light transmittance and a molded article thereof can be provided.

DESCRIPTION OF EMBODIMENTS

Below, various embodiments of the resin sheet shall be explained, followed by an explanation of a method for manufacturing the resin sheet, but in cases in which the specific explanation of one embodiment described herein applies to another embodiment, the explanation thereof for the other embodiment shall be omitted.

First Embodiment

The resin sheet according to the first embodiment of the present invention is a resin sheet that has hair-like bodies arranged regularly on at least one surface of an underlayer and in which a continuous phase is formed without any structural boundary between the underlayer and the hair-like bodies, wherein the average height of the hair-like bodies is no less than 30 μm and no greater than 500 μm, the total light transmittance of the resin sheet measured in accordance with JIS K 7136-1 is no less than 0.1% and no greater than 20%, and the contrast ratio measured in accordance with JIS K 5600 4-1 is no less than 70% and no greater than 98%.

<Underlayer>

Figure 1:
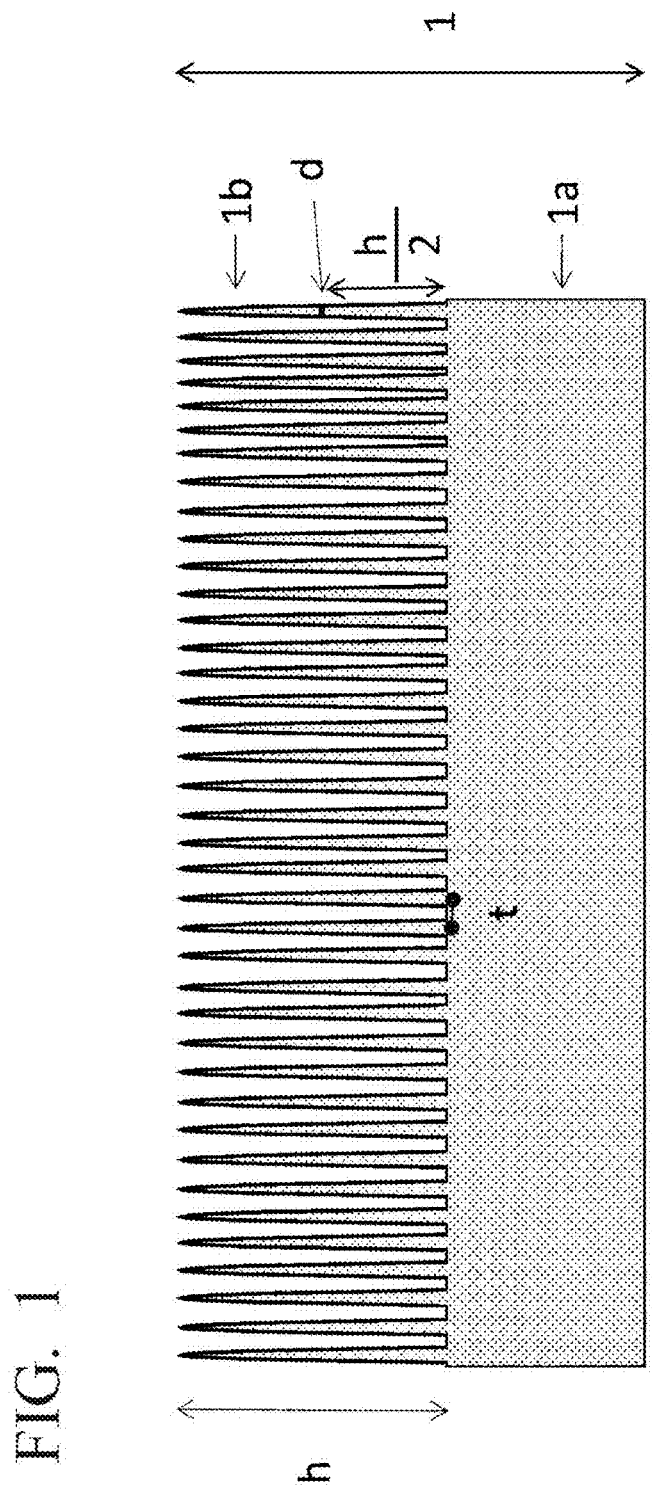
FIG. 1 is a vertical cross-sectional schematic showing a resin sheet according to the first embodiment of the present invention.
Figure 2:
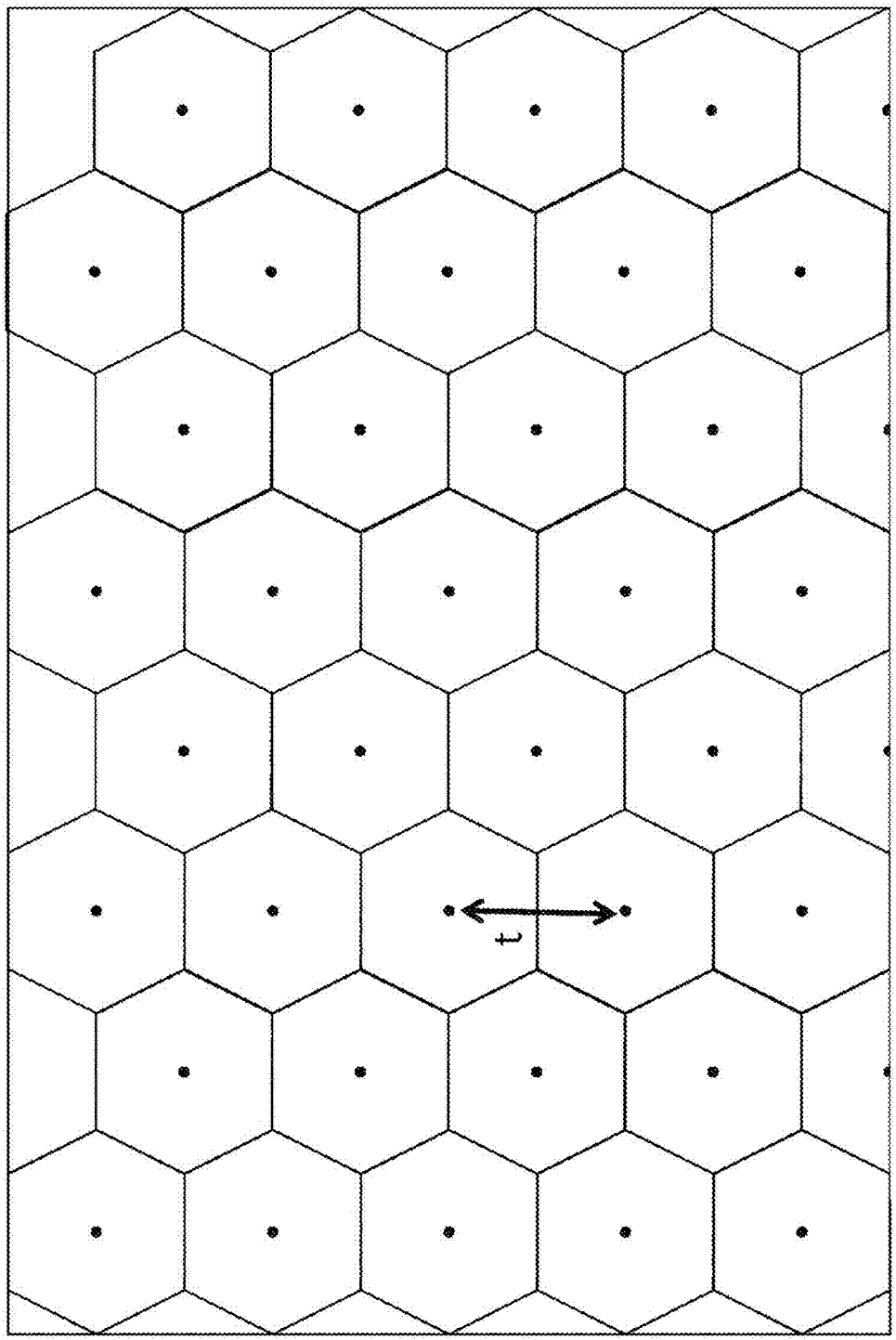
FIG. 2 is a schematic plan view of the resin sheet of FIG. 1.

The underlayer (1a) is a layer underneath the hair-like bodies and, within the portion indicated by reference sign 1 in FIG. 1, is the portion of the surface other than the hair-like bodies 1b. The thickness of the underlayer is the thickness from the roots of the hair-like bodies to the surface on the opposite side of the underlayer. The average thickness of the underlayer is preferably 15-1,000 µm, more preferably 30-800 µm, and yet more preferably 50-200 µm. By setting the thickness to no less than 15 µm, the height of the hair-like bodies can be sufficiently expressed. Further, by setting the thickness to no greater than 1,000 µm, the hair-like bodies can be formed efficiently. A continuous phase is formed without a structural boundary between the underlayer and the hair-like bodies. The absence of a structural boundary means that the underlayer and hair-like bodies are integrally formed and that there is no structurally clear border section therebetween. Further, forming a continuous phase means a state in which there are no seams between the underlayer and the hair-like bodies and no discontinuities (is a continuous phase). On this point, the present invention differs from a structure in which hair-like bodies are transplanted to an underlayer. The underlayer and hair-like bodies may have the same composition and the bonds between the underlayer and the hair-like bodies may include covalent bonds. Covalent bonds are chemical bonds formed by an electron pair being shared by two atoms, but in resins which are chain molecules in which the monomers are connected, each polymer is bonded by covalent bonds and is bonded more strongly than by the van der Waals bonds or hydrogen bonds acting between the polymer molecules.

Further, the underlayer and the hair-like bodies may be derived not from separate, but from the same solid resin sheet. Derived from the same solid resin sheet means, for example, the hair-like bodies and the underlayer being obtained, directly or indirectly, based on the same solid resin sheet.

Further, the underlayer and the hair-like bodies may be formed from the same solid resin sheet. Formed from the same solid resin sheet means that the hair-like bodies and the underlayer are directly formed by working a single resin sheet.

By forming a continuous phase without a structural boundary between the underlayer and the hair-like bodies, the hair-like bodies separating from the underlayer due to an external stimulus is suppressed and the sheet becomes one with a good tactile sensation. Further, manufacturing with fewer steps than when transplanting hair-like bodies can be carried out.

The underlayer and the hair-like bodies may comprise the same resin composition having a thermoplastic resin as a main component. Having a thermoplastic resin as a main component means containing no less than 50 mass %, no less than 60 mass %, no less than 70 mass %, no less than 80 mass %, or no less than 90 mass % of a thermoplastic resin. A resin comprising one or more of a styrene-based resin, an olefin-based resin, a polyvinyl chloride resin, a thermoplastic elastomer, and a fluorine-based resin can be used as the thermoplastic resin.

Styrene-based monomers such as styrene, α-methylstyrene, p-methylstyrene, dimethylstyrene, p-t-butylstyrene, or chlorostyrene alone or copolymers thereof, copolymers of such a styrene-based monomer and another monomer, for example, a styrene-ethylene copolymer (SE resin) or a styrene-acrylonitrile copolymer (AS resin), or of the styrene-based monomer and yet another polymer, for example, a grafted polymer graft polymerized in the presence of a diene-based rubber-like polymer such as polybutadiene, a styrene-butadiene copolymer, polyisoprene, or polychloroprene, for example, a polystyrene such as high-impact polystyrene (HIPS resin) or a styrene-acrylonitrile graft polymer (ABS resin) can be used as the styrene-based resin. Further, a styrene-based thermoplastic elastomer can also be used.

Polyolefin-based resin means a resin comprising a polymer comprising α-olefin as a monomer and includes polyethylene-based resins and polypropylene-based resins. High-density polyethylenes, low-density polyethylenes, linear low-density polyethylenes, linear medium-density polyethylenes, etc. can be used as the polyethylene (PE) resin and there are not only these alone, but, for example, ethylene-vinyl acetate copolymers, ethylene-acrylic acid copolymers, ethylene-acrylic ester copolymers, ethylene methacrylic ester copolymers, ethylene-vinyl acetate-vinyl chloride copolymers, etc. Considering crosslinkability by electron beam irradiation, using a linear low-density polyethylene or a linear medium-density polyethylene is desirable.

Further, a homopolypropylene, a random polypropylene, a block polypropylene, etc. can be used as the polypropylene (PP) resin. When using a homopolypropylene, the structure of the homopolypropylene may be any of isotactic, atactic, or syndiotactic. When using a random polypropylene, a substance preferably having 2-20 carbon atoms and more preferably having 4-12 carbon atoms, for example, ethylene, 1-butene, 1-pentene, 1-hexene, 1-heptene, 1-octene, 1-nonene, or 1-decene can be used as the α-olefin to be copolymerized with propylene. When using a block polypropylene, a block copolymer (block polypropylene), a block copolymer comprising a rubber component, a graft copolymer, etc. can be used. In addition to using these olefin-based resins alone, they may be used in combination with other olefin-based resins. Considering crosslinkability by electron beam irradiation, using a random polypropylene or a block polypropylene is desirable.

A vinyl chloride homopolymer or a copolymer of vinyl chloride and another comonomer can be used as the polyvinyl chloride. When the polyvinyl chloride is a copolymer, the polyvinyl chloride may be a random copolymer or may be a graft copolymer. A substance in which, for example, an ethylene-vinyl acetate copolymer or a thermoplastic urethane polymer is made the trunk polymer and vinyl chloride is graft polymerized thereto can be raised as one example of a graft copolymer. The polyvinyl chloride of the present embodiment is a composition demonstrating an extrusion-moldable soft polyvinyl chloride and containing an additive such as a polymer plasticizer. A publicly known polymer plasticizer can be used as the polymer plasticizer, but, for example, an ethylene copolymer polymer plasticizer such as an ethylene-vinyl acetate-carbon monoxide copolymer, an ethylene-(meth)acrylic ester-carbon monoxide copolymer, or an ethylene-vinyl acetate copolymer with a high vinyl acetate content can be raised as a preferred example.

Substances having a structure in which a soft polymer substance and a hard polymer substance are combined are included as the thermoplastic elastomer. Specifically, there are styrene-based elastomers, olefin-based elastomers, vinyl chloride-based elastomers, polyester-based elastomers, polyimide-based elastomers, polyurethane-based elastomers, etc. Regarding polyurethane-based elastomers, as a combination of an isocyanate and a polyol, which are raw materials, any combination of an MDI system, an H12MDI system, or an HDI system as the isocyanate and a polyether system, a polyester system, or a polycarbonate system as the polyol may be selected or multiple may be combined. These elastomers can be selected from among those generally commercially available and used.

A vinylidene fluoride homopolymer and a vinylidene fluoride copolymer having vinylidene fluoride as the main component can be used as the fluorine resin. Polyvinylidene fluoride (PVDF) resins are crystalline resins exhibiting various crystal structures such as α-type, β-type, γ-type, and αp-type, but as the vinylidene fluoride copolymer, there are, for example, vinylidene fluoride-hexafluoropropylene copolymers, vinylidene fluoride-tetrafluoroethylene copolymers, vinylidene fluoride-chlorotrifluoroethylene copolymers, vinylidene fluoride-trifluoroethylene copolymers, vinylidene fluoride-tetrafluoroethlyene-hexafluoropropylene three-component copolymers, vinylidene fluoride-chlorotrifluoroethylene-hexafluoropropylene three-component copolymers, and mixtures of two or more thereof.

It is preferable that the melt mass flow rate of the resin is no less than 1 g/10 minutes at 190° C. to 300° C. By setting the rate to no less than 1 g/10 min, the transferability of the shape of the hair-like bodies can be improved. The melt mass flow rate conforms to JIS K 7210 and is a value measured under the conditions of any load (2.16 to 10.0 kg) at a test temperature at any temperature from 190° C. to 300° C.

The composition of the abovementioned resin may be alloyed with the abovementioned resins at any ratio so long as this does not inhibit the effects of the present invention, particularly the formation of the hair-like bodies. For example, when a polyethylene and a styrene-based thermoplastic elastomer are alloyed, it is preferable that no less than 50 mass % of the polyethylene be included with respect to 100 mass % of the resin composition. Furthermore, the thermoplastic resin may contain other additives. Additives such as colorants such as pigments or dyes, water repellents, oil repellents, lubricant/mold release agents such as silicone oil or alkyl ester-based agents, fibrous reinforcement agents such as glass fibers, granular particles such as talc, clay, or silica or squamous particles such as mica as fillers, low molecular weight-type antistatic agents such as a salt compound of sulfonic acid and an alkali metal or the like or high molecular weight-type antistatic agents such as polyether ester amide or the like, ultraviolet absorbing agents, flame retardants, antibacterial agents, antiviral agents, and thermal stabilizers can be added as the other additives so long as this does not inhibit the effects of the present invention. Further, scrap resin generated in the resin sheet manufacturing process can be mixed and used.

As the colorants, there are masterbatches, colored pellets, dry colorants, paste colorants, liquid colorants, inks, etc. and coloring may be performed by kneading with the resin in an extruder or may be performed by printing on or coating the surface of the hair-like bodies. Among these, techniques for coloring by kneading a masterbatch with the resin in an extruder are suitable. As the coloring material used in the colorant, there are carbon black, inorganic pigments, organic pigments, basic dyes, acidic dyes, etc. and among these, carbon black is suitably used. The amount of the colorant added is preferably 0.01 mass % to 5 mass %, more preferably 0.02 mass % to 3 mass %, and yet more preferably 0.05 mass % to 2 mass % as the final content of the coloring material. By setting the content to no less than 0.01 mass %, concerns over insufficient coloring can be reduced and by setting the content to no greater than 5 mass %, concerns over the material becoming brittle and the hair-like bodies not being able to be uniformly formed can be reduced.

The colors of the underlayer and the hair-like bodies in the resin sheet of the present invention are not particularly limited so long the total light transmittance and the contrast ratio of the resin sheet are within certain ranges.

As the water repellent/oil repellent, there are silicone-based water repellents, carnauba wax, and fluorine-based water/oil repellents. Organopolysiloxane, dimethylpolysiloxane, methylphenylpolysiloxane, methylhydrogenpolysiloxane, etc. are examples of the silicone and among these, dimethylpolysiloxane is suitably used. As commercial products, there are "Clinbell CB50-PP", "Clinbell CB-30PE", "Clinbell CB-1", "Clinbell CB-50AB" (manufactured by Fuji Chemical Industries, Ltd.), etc. in which, for example, silicon is alloyed with a resin. For the carnauba wax, there is, for example, "Carnauba No. 1" (manufactured by NIKKO RICA CORPORATION), etc. as commercially available products, and for fluorine-based water/oil repellents, there are surfactants having a perfluoroalkyl group, "Surflon KT-PA" (manufactured by AGC SEIMI CHEMICAL CO., LTD.) as a commercial product, etc. The amount of the water/oil repellent added is preferably 0.5 mass % to 25 mass %. At less than 0.5 mass %, there are concerns that sufficient water repellency/oil repellency effects will not be obtained and there are concerns that the moldability will worsen if the amount exceeds 25 mass %.

As the antistatic agent, there are polyetheresteramide-based polymer-type antistatic agents, ionomer-based polymer-type antistatic agents, etc. As commercially available polyetheresteramide-based polymer-type antistatic agents, there are "Pelestat 230", "Pelestat 6500", "Pelectron AS", "Pelectron HS" (manufactured by Sanyo Chemical Industries, Ltd.), etc. As commercially available ionomer-based polymer-type antistatic agents, there are "Entira SD100", "Entira MK400" (manufactured by DU PONT-MITSUI POLYCHEMICALS), etc. The amount of the antistatic agent added is preferably 5 mass % to 30 mass %. At less than 5 mass %, there are concerns that sufficient antistatic properties will not be obtained and production costs will increase if the amount exceeds 30 mass %.

Among inorganic-based and organic-based antibacterial agents, either may be added. Considering dispersability, inorganic-based agents are preferable. Specifically, there are metal ion (Ag, Zn, Cu) inorganic-based antibacterial agents, calcined shell calcium-based antibacterial agents, etc. As commercially available metal ion inorganic-based antibacterial agents, there are "Bactekiller BM102VT" (manufactured by Fuji Chemical Industries, Ltd.), "Novaron VZF200", "Novaron (AG300)" (manufactured by TOAGOSEI CO., LTD.), "KM-10D-G", "IM-10D-L" (manufactured by Sinanen Zeomic Co., Ltd.), etc. As calcined shell calcium-based antibacterial agents, there is "Scallow" (manufactured by FID, Ltd.), etc. The amount of the antibacterial agent added is preferably 0.5 mass % to 5 mass %. At less than 0.5 mass %, there are concerns that sufficient antibacterial performance will not be obtained and production costs will increase if the amount exceeds 5 mass %.

Inorganic and organic ultraviolet absorbing agents can be used as the ultraviolet absorbing agent.

For example, titanium oxide, zinc oxide, cesium oxide, iron oxide, and numerous other substances can be used as inorganic ultraviolet absorbing agents. Among these, zinc oxide in particular has excellent transparency and ultraviolet impermeability and is preferred. As a commercially available product, for example, the triazine-based ultraviolet absorbing agent "TINUVIN 1600" (manufactured by BASF Japan Ltd.), etc. can be used.

When an inorganic ultraviolet absorbing agent is used, the amount thereof added is preferably 1-5 parts by mass with respect to a total of 100 parts by mass of the resin composition. With the amount added at less than 1 part by mass, there are concerns that the effect of suppressing degradation of the sheet due to ultraviolet light will lower and production costs will increase if the amount exceeds 5 parts by mass.

Further, a masterbatch, etc. in which the inorganic ultraviolet absorbing agent has been alloyed with the thermoplastic resin in advance can be used. For example, as commercially available masterbatches based on a urethane-based thermoplastic elastomer, there are "Weather Resistant Master UNS (Polyester-based)" (manufactured by FIC) and "Weather Resistant Master UNE (Polyether-based)" (manufactured by FIC) and considering production efficiency, using a masterbatch is preferred. The amount of the masterbatch added is preferably 1-5 parts by mass with respect to 100 parts by mass of the resin composition.

Further, triazine-based, benzotriazole-based, oxalic acid-based, benzophenone-based, hindered amine-based substances and numerous others can be used as the organic ultraviolet absorbing agent. Preferably, in order to minimize volatilization when producing a film or when used, a high molecular weight-type ultraviolet absorbing agent with a molecular weight no less than 300 is suitably used.

When an organic ultraviolet absorbing agent is used, the amount thereof added is preferably no less than 4 parts by mass with respect to a total of 100 parts by mass of the resin composition. With the content at less than 4 parts by mass, there are concerns that the effect of suppressing degradation of the sheet due to ultraviolet light will not be sufficiently obtained. Whereas, if the amount exceeds 8 parts by mass, not only does the effect of suppressing the degradation of the sheet due to ultraviolet light peak, but this is also not preferable in terms of costs.

Alkyl-based mold release agents such as aliphatic hydrocarbon-based compounds, higher fatty acid-based compounds, higher fatty alcohol-based compounds and fatty acid amide-based compounds, etc., silicone-based mold release agents, and fluorine-based mold release agents, can be used as the lubricant/mold-release agent. When using a mold release agent, the amount thereof added is preferably 0.01-5 parts by mass, more preferably 0.05-3 parts by mass, and yet more preferably 0.1-2 parts by mass of a total 100 parts by mass with the resin composition. By setting the amount added to no less than 0.01 parts by mass, concerns that mold release effects will lower are reduced and by setting the amount to no greater than 5 parts by mass, concerns that there will be bleed out to the sheet surface are reduced.

Further, masterbatches, etc. in which the lubricant/mold release agent has been alloyed with a thermoplastic resin can be used. For example, as commercially available masterbatches based on a urethane-based thermoplastic elastomer, there is "Wax Master V" (manufactured by BASF Japan Ltd.) and considering production efficiency, using a masterbatch is preferable. The amount of the masterbatch added is preferably 1-8 parts by mass, more preferably 2-7 parts by mass, and yet more preferably 3-6 parts by mass of a total of 100 parts by mass with the resin composition.

<Hair-Like Bodies>

The hair-like bodies ($1b$) are a portion extending hair-like from the surface of the base layer ($1a$), as shown in FIG. 1. The hair-like bodies are arranged regularly on the surface of the underlayer. Here, arranged regularly means a state in which the hair-like bodies are not arranged randomly, that is, a state of arrangement in an orderly fashion in one direction or in two directions (for example, at a fixed spacing). Whether or not the arrangement of the hair-like bodies is regular is determined based on the state of arrangement of the roots of the hair-like bodies. In certain embodiments, the hair-like bodies are positioned on the underlayer at a predetermined spacing and the positions of the bottom surfaces of the hair-like bodies are arranged in an orderly fashion in the longitudinal direction and the transverse direction of the underlayer. Further, the form of arrangement of the hair-like bodies is not particularly limited and vertically and horizontally arranged grid arrangement, staggered arrangement, etc. can be selected. Due to the hair-like bodies being arranged regularly on the surface of the underlayer, a good tactile sensation is readily expressed, uniformly and without irregularities. Falling of the hair-like bodies occurs due to the application of a load such as, for example, tracing with a finger and finger marks in which the gloss and color tone appear different from those of the surrounding portion can be formed. Further, due to the hair-like bodies, the tactile sensation can become like that of a suede-like napped sheet.

The average height (h) of the hair-like bodies is preferably 30-500 µm, more preferably 30-250 µm, and still more preferably 30-220 µm. By setting the average height to no less than 30 µm, a good tactile sensation can be sufficiently ensured and by setting the average height to no greater than 500 µm, a good tactile sensation such as moistness, softness, and fluffiness is obtained.

When the hair-like bodies stand roughly straight with respect to the underlayer, the length of the hair-like bodies from root to tip represents the height of the hair-like bodies. Meanwhile, when the hair-like bodies are slanted with respect to the underlayer or the hair-like bodies have a portion that curls, the distance from the surface of the underlayer at the location of the hair-like bodies most removed from the surface of the underlayer is made the height h of the hair-like bodies. Further, the total value of the spacing from the tip to the center of the root of the hair-like bodies segmented by multipoint measurement is made the length L of the hair-like bodies.

The height of the hair-like bodies and the length of the hair-like bodies are measured at a number of random locations on the resin sheet using an electron microscope and image processing software and the arithmetic mean values of the measurements can be used as the average height of the hair-like bodies and the average length of the hair-like bodies.

The average diameter (d) of the hair-like bodies is preferably 1-50 µm, more preferably 5-30 µm, and still more preferably 10-30 µm. By setting the average diameter of the hair-like bodies to no less than 1 µm, a good tactile sensation can be ensured and by setting the average diameter of the hair-like bodies to no greater than 50 µm, a good tactile sensation such as moistness, softness, and fluffiness is obtained. The diameter at mid-height (h/2) of the hair-like bodies is measured at a number of locations on the resin sheet using an electron microscope and image processing software and the arithmetic mean value of the measurements is used as the average diameter of the hair-like bodies.

Further, the aspect ratio of the hair-like bodies can be represented as (average height of the hair-like bodies/average diameter of the hair-like bodies). The aspect ratio of the hair-like bodies is preferably 2-20, more preferably 2-10, and still more preferably 2-5. By setting the aspect ratio to no less than 2, a good tactile sensation can be ensured and by setting the aspect ratio to no greater than 20, a good tactile sensation such as moistness, softness, and fluffiness is obtained.

Meanwhile, the average bottom surface diameter of the hair-like bodies can also be made a standard for the aspect ratio. The average bottom surface diameter of the hair-like bodies is preferably 10-150 μm. The average bottom surface diameter of the hair-like bodies is a value in which the spacing between neighboring hair-like bodies is measured at a number of locations on the resin sheet and the arithmetic mean value of the measurements is used. The aspect ratio when the bottom surface diameter of the hair-like bodies is made a reference is preferably 1.0-10, more preferably 1.0-5, and still more preferably 1.0-2.5. By setting the aspect ratio to no less than 1.0, a good tactile sensation can be ensured and by setting the aspect ratio to no greater than 120, a good tactile sensation such as moistness, softness, and fluffiness is obtained.

The average spacing (t) of the hair-like bodies is preferably 20-200 μm, more preferably 30-150 μm, and still more preferably 35-100 μm. The spacing of the hair-like bodies means the distance from the center of the root of a hair-like body to the center of the root of a neighboring hair-like body. By setting the average spacing to no less than 20 μm, a good tactile sensation is ensured and by setting the average spacing to no greater than 200 μm, a good tactile sensation such as moistness, softness, and fluffiness is obtained. The average spacing of the hair-like bodies is a value in which the spacing between neighboring hair-like bodies is measured at a number of locations on the resin sheet and the arithmetic mean value of the measurements is used.

The shape of the hair-like bodies is not particularly limited and may be configured to extend hair-like in a direction away from the underlayer in a shape in which the hair-like bodies gradually thin approaching the tip or in which a swelling is formed at the tip. In short, the hair-like bodies may have a shape in which the cross-sectional area gradually shrinks with increasing distance from the underlayer and then once again increases when the shape terminates. Further, the shape of the tip part of the hair-like bodies may be bud-shaped or mushroom-shaped. Moreover, the hair-like bodies may have a portion positioned at the base end extending in a direction away from the underlayer, a portion that extends from the portion positioned at the base end and is curved based on a fixed curvature or a curvature that gradually changes, and furthermore, a portion that is wound in a helix shape or a spiral shape. In this case, the tip parts of the hair-like bodies may have a shape that is folded inward. By having such a shape, a better tactile sensation is expressed. Further, due to the bud-shaped or mushroom-shaped portion being hollow, a better tactile sensation is expressed. When forming a bud-shaped or mushroom-shaped portion at the hair-like tips, it is preferable that the ratio of the average diameter of the width of the bud shape or mushroom shape with respect to the average diameter of the hair-like bodies be no less than 1.1 times. The height of the bud shape or mushroom shape is preferably no less than 7 μm. The average diameter of the hair-like bodies and the average diameter of the width and the height of the bud shape or mushroom shape are measured from a scanning electron microscope photograph and the arithmetic mean value is used. The hair-like bodies comprise a resin composition. The same resins that can be used in the underlayer can be used as the resin contained in the composition.

The underlayer and the hair-like bodies having at least a partially crosslinked structure means that the resins contained in the underlayer and the hair-like bodies form an at least partially three-dimensional crosslinked structure (for example, a three-dimensional network structure). In certain embodiments, at least part of the hair-like bodies is a crosslinked body, in other embodiments, the entire surface of the hair-like bodies is a crosslinked body, and in still other embodiments, the entirety of the hair-like bodies (from the interface with the underlayer to the tip) is a crosslinked body. As methods for forming the crosslinked body, there are, for example, methods for, after forming the resin sheet, irradiating a surface that the hair-like bodies possess with an electron beam and methods for adding an organic peroxide and forming the crosslinked body with heat and humidity either during or after molding the resin sheet. As the resin to which the organic peroxide is added, among commercially available products, there is "LINKLON" manufactured by Mitsubishi Chemical Corporation, etc. In the first embodiment of the present invention, a crosslinked body (an electron beam-crosslinked body) can be formed by electron beam irradiation.

[Resin Sheet]

The resin sheet in the first embodiment of the present invention has a thermoplastic resin as a main component. Meanwhile, as described above, a crosslinked body (an electron beam-crosslinked body) may be formed by electron beam irradiation and there may be locations that are partially no longer thermoplastic due thereto.

Further, the thickness of the resin sheet is the sheet thickness combining the average height of the hair-like bodies and the average thickness of the underlayer. The sheet thickness is preferably 50-1,500 μm, more preferably 50-1,050 μm, and still more preferably 120-600 μm. By setting the thickness to no less than 50 μm, a good tactile sensation can be sufficiently ensured and by setting the thickness to no greater than 1,500 μm, manufacturing costs can be suppressed.

In the present embodiment, the "tactile sensation" means the feeling and texture of the surface of the resin sheet. When touching the surface of the resin sheet, whether comfortableness is felt is judged and, when felt, a good specific texture such as moistness, softness, or fluffiness is made the good tactile sensation. Further, the good tactile sensation can be specified by, other than a sensory evaluation of the texture, etc., the previously discussed aspect ratio.

The resin sheet of the present invention has a total light transmittance measured in accordance with JIS K 7136-1 that is no greater than 0.1% and no less than 20%, more preferably no less than 0.5% and no greater than 15%, and still more preferably no less than 1% and no greater than 10%. If the total light transmittance measured in accordance with JIS K 7136-1 is no less than 0.1%, optical presentation through the resin sheet is possible and if the total light transmittance is no greater than 20%, the feeling (appearance) as a tactile material can be maintained when not performing optical presentation. Further, if the total light transmittance exceeds 20%, the shade underneath may come through, changing the appearance, and electronic components incorporated for optical presentation may become visible, so this is not preferred.

The contrast ratio is the degree to which the difference in color underneath is concealed and the larger this value is, the greater the effect of hiding the color underneath is judged to be. In the resin sheet of the present invention, the contrast ratio measured in accordance with JIS K 5600 4-1 is no less than 70% and no greater than 98%, more preferably no less than 80% and no greater than 95%, and still more preferably no less than 85% and no greater than 93%. By setting the contrast ratio measured in accordance with JIS K 5600 4-1 to no less than 70%, the difference in color underneath is hidden, so various materials can be used as the underlayer regardless of their color and by setting the contrast ratio to no greater than 98%, when optical presentation is carried out, decreases in design properties are reduced and the visibility of the optical presentation of indicator displays, etc. can be secured.

Second Embodiment

Figure 3:
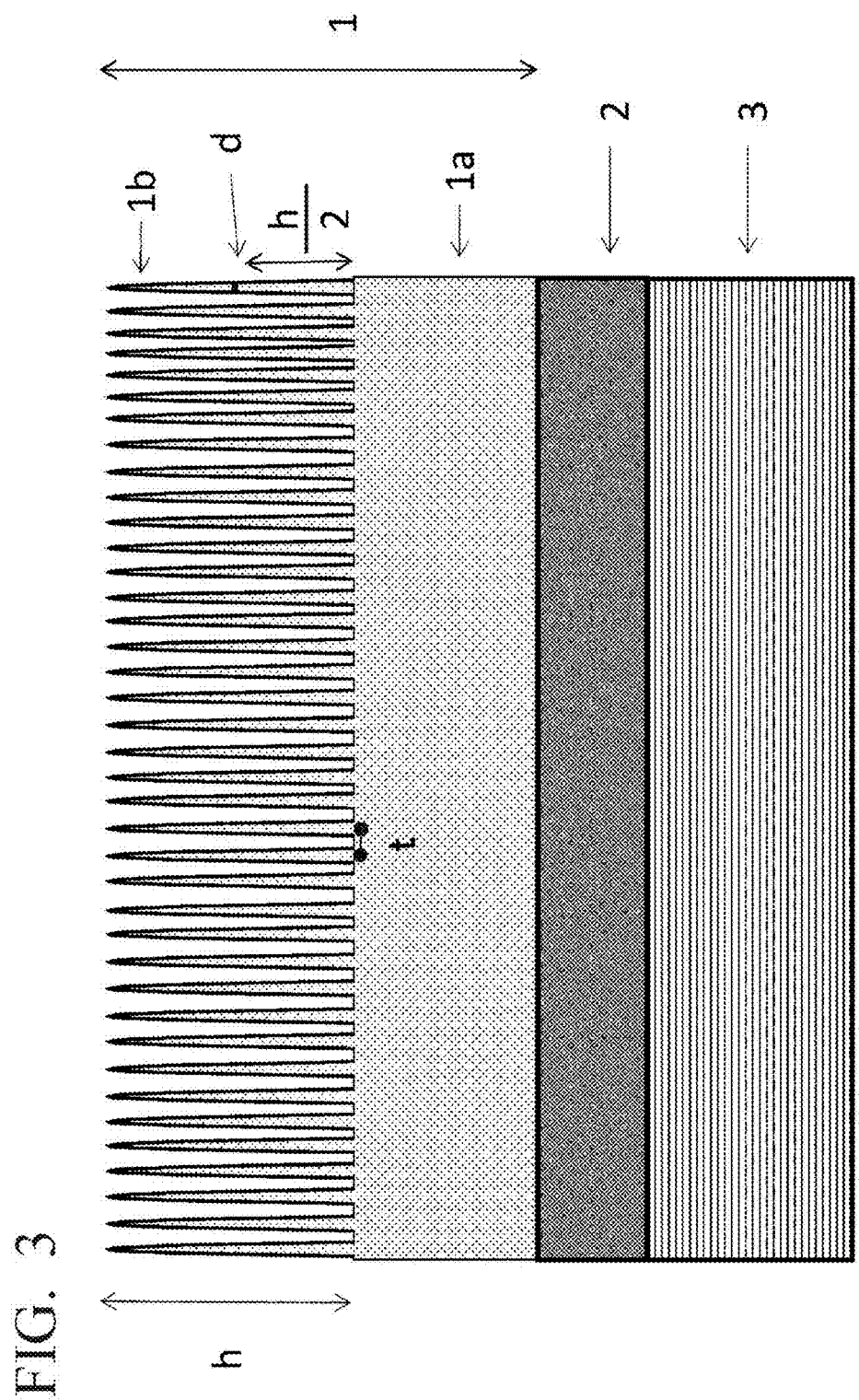
FIG. 3 is a vertical side cross-sectional schematic showing the layer structure of a resin sheet according to the second embodiment of the present invention.

An example of the resin sheet according to the second embodiment of the present invention is a resin sheet in which a sealant resin layer (2) is formed between the underlayer (1a) and the substrate layer (3), as shown in FIG. 3. That is, the layer configuration of the resin sheet according to the second embodiment is, from top to bottom, the hair-like bodies and the underlayer (1), the sealant resin layer (2), and the substrate layer (3). Here, the hair-like bodies are the same as those explained in the first embodiment, so explanation thereof is omitted. However, the thickness of the hair-like bodies and the underlayer represented by the total of the average height of the hair-like bodies and the average thickness of the underlayer is preferably 115-900 µm. By setting the thickness to no less than 115 µm, a good tactile sensation can be ensured and by setting the thickness to no greater than 900 µm, production costs can be suppressed.

<Substrate Layer>

The substrate layer is preferably a thermoplastic resin such as a styrene-based resin, an olefin-based resin, a polyester-based resin, a nylon-based resin, an acrylic-based resin, or a thermoplastic elastomer. Further, when laminating, there is lamination by coextrusion molding and lamination by extrusion laminate molding or dry laminate molding using a nonoriented film or a biaxially oriented film.

Polyethylene terephthalate, polybutylene terephthalate, polyethylene-2,6-naphthalate, polymethylene terephthalate, and a polyester-based resin in which, as copolymerization components, for example, a diol component such as diethylene glycol, neopentyl glycol, and polyalkylene glycol and a dicarboxylic acid component such as adipic acid, sebacic acid, phthalic acid, isophthalic acid, and 2,6-naphthalene dicarboxylic acid are copolymerized can be used as the polyester-based resin.

A lactam polymer such as caprolactam and laurolactam, an aminocarboxylic acid polymer such as 6-aminocaproic acid, 11-am inoundecanoic acid, and 12-am inododecanoic acid, a polycondensate of a diamine unit such as an aliphatic diamine such as hexamethylenediamine, decamethylenediamine, dodecamethylenediamine, and 2,2,4- or 2,4-4-trimethylhexamethylenediamine, an alicyclic diamine such as 1,3- or 1,4-bis(aminomethyl)cyclohexane or bis(p-aminocyclohexylmethane), or an aromatic diamine such as m- or p-xylylenediamine, and a dicarboxylic acid unit such as an aliphatic dicarboxylic acid such as adipic acid, suberic acid, and sebacic acid, an alicyclic dicarboxylic acid such as cyclohexanedicarboxylic acid, or an aromatic dicarboxylic acid such as terephthalic acid and isophthalic acid, and copolymers, etc. thereof can be used as the nylon-based resin. For example, there are nylon 6, nylon 9, nylon 11, nylon 12, nylon 66, nylon 610, nylon 611, nylon 612, nylon 6T, nylon 6I, nylon MXD6, nylon 6/66, nylon 6/610, nylon 6/6T, nylon 6I/6T, etc. and among these, nylon 6 and nylon MXD6 are suitable.

If the polymer is a vinyl polymer based on methacrylic ester monomers, it can be used as an acrylic resin and the structure, etc. thereof is not particularly limited. As the methacrylic ester monomers, there are, for example, methyl methacrylate, ethyl methacrylate, propyl methacrylate, butyl methacrylate, pentyl methacrylate, hexyl methacrylate, etc. Further, the alkyl group such as a propyl group, butyl group, pentyl group, or hexyl group in the methacrylic ester monomer may be linear or may be branched. The methacrylic ester resin may be a homopolymer of a methacrylic ester monomer or a copolymer of multiple methacrylic ester monomers and may have monomer units derived from known vinyl compounds other than methacrylic ester such as ethylene, propylene, butadiene, styrene, α-methylstyrene, acrylonitrile, and acrylic acid.

The substrate layer may be alloyed with the abovementioned thermoplastic resins at any ratio so long as this does not inhibit the effects of the present invention, as necessary. Furthermore, the substrate layer may contain other additives. Additives such as water/oil repellents, colorants such as pigments or dyes, lubricants/mold release agents such as silicone oil or alkyl ester-based agents, fibrous reinforcement agents such as glass fibers, granular particles such as talc, clay, or silica or squamous particles such as mica as fillers, low molecular weight-type antistatic agents such as a salt compound of sulfonic acid and an alkali metal or the like or high molecular weight-type antistatic agents such as polyether ester amide or the like, ultraviolet absorbing agents, flame retardants, antibacterial agents, antiviral agents, and thermal stabilizers can be added as the other additives so long as this does not inhibit the effects of the present invention. Further, scrap resin generated in the resin sheet manufacturing process can be mixed and used.

As the colorants, there are masterbatches, colored pellets, dry colorants, paste colorants, liquid colorants, inks, etc. and coloring may be performed by kneading with the resin in an extruder. Among these, techniques for coloring by kneading a masterbatch with the resin in an extruder are suitable. As the coloring material used in the colorant, there are carbon black, inorganic pigments, organic pigments, basic dyes, acidic dyes, etc. and among these, carbon black is suitably used. The amount of the colorant added depends on the amount of the colorant added to the hair-like bodies and the underlayer or the thickness of the hair-like bodies and the underlayer, but the final content of the coloring material is preferably no greater than 0.20 mass %, more preferably no greater than 0.18 mass %, and still more preferably no greater than 0.15 mass %. By setting the content to no greater than 0.20 mass %, concerns that the light transmittance will be no greater than a certain level can be reduced.

The color of the substrate layer in the resin sheet of the present invention is not particularly limited if the total light transmittance and the contrast ratio of the resin sheet are within certain ranges.

Further, in the present embodiment, the substrate layer may have a partially crosslinked structure so long as this does not inhibit the effects of the present invention.

The thickness of the substrate layer is preferably 50-1,000 µm, more preferably 100-800 µm, and still more preferably 150-600 µm. By setting the thickness to no less than 50 µm, tactility and concealment of the underlayer can be secured and by setting the thickness to no greater than 1,000 µm, production costs can be suppressed.

<Sealant Resin Layer>

The sealant resin layer is to cause adhesion between the base layer and the substrate layer to be expressed and a modified olefin-based resin, a hydrogenated styrene-based thermoplastic elastomer, etc. can be used as resin components.

Olefin-based resins such as olefins with about 2-8 carbon atoms such as ethylene, propylene, and butene-1, copolymers of these olefins and other olefins with about 2-20 carbon atoms such as ethylene, propylene, butene-1, 3-methylbutene-1, pentene-1, 4-methylpentene-1, hexene-1, octene-1, and decene-1 or copolymers of these olefins and vinyl compounds such as vinyl acetate, vinyl chloride, acrylic acid, methacrylic acid, acrylic ester, methacrylic ester, and styrene, and olefin-based rubbers such as ethylene-propylene copolymers, ethylene-propylene-diene copolymers, ethylene-butene-1 copolymers, and propylene-butene-1 copolymers modified under graft reaction conditions with unsaturated carboxylic acids such as acrylic acid, methacrylic acid, crotonic acid, isocrotonic acid, maleic acid, fumaric acid, itaconic acid, citraconic acid, and tetrahydrophthalic acid or derivatives of the acids such as halides, amides, imides, anhydrides, and esters, specifically, malonyl chloride, maleimide, maleic anhydride, citraconic anhydride, monomethyl maleate, dimethyl maleate, and glycidyl maleate can be used as the modified olefin-based resin.

Among these, an "ethylene-propylene-diene copolymer" or ethylene-propylene or butene-1 copolymer rubber modified with an unsaturated dicarboxylic acid or an anhydride thereof, in particular maleic acid or an anhydride thereof, is suitable.

A hydrogenated copolymer of a styrene-based monomer and butadiene or isoprene, a hydrogenated styrene-butadiene-styrene block copolymer (styrene-ethylene/butylene-styrene block copolymer), a hydrogenated styrene-isoprene-styrene block copolymer (styrene-ethylene/propylene-styrene block copolymer), etc. can be used as the hydrogenated styrene-based thermoplastic elastomer and, in particular, a styrene-ethylene/butylene-styrene block copolymer is preferable.

The thickness of the sealant resin layer is preferably 20-90 μm and more preferably 40-80 μm. By setting the thickness to no less than 20 μm, interlayer separation occurring between the underlayer and the substrate layer can be suppressed and by setting the average thickness to no greater than 90 μm, production costs can be suppressed.

The sealant resin layer may be alloyed with the abovementioned thermoplastic resins at any ratio, as necessary, so long as this does not inhibit the effects of the present invention. Furthermore, the sealant resin layer may contain other additives. Additives such as water repellents, oil repellents, colorants such as pigments or dyes, lubricants/mold release agents such as silicone oil or alkyl ester-based agents, fibrous reinforcement agents such as glass fibers, granular particles such as talc, clay, or silica or squamous particles such as mica as fillers, low molecular weight-type antistatic agents such as a salt compound of sulfonic acid and an alkali metal or the like or high molecular weight-type antistatic agents such as polyether ester amide or the like, ultraviolet absorbing agents, flame retardants, antibacterial agents, antiviral agents, and thermal stabilizers can be added as the other additives so long as this does not inhibit the effects of the present invention. Further, in the present embodiment, the sealant resin layer may have a partially crosslinked structure so long as this does not inhibit the effects of the present invention.

Third Embodiment

Figure 4:
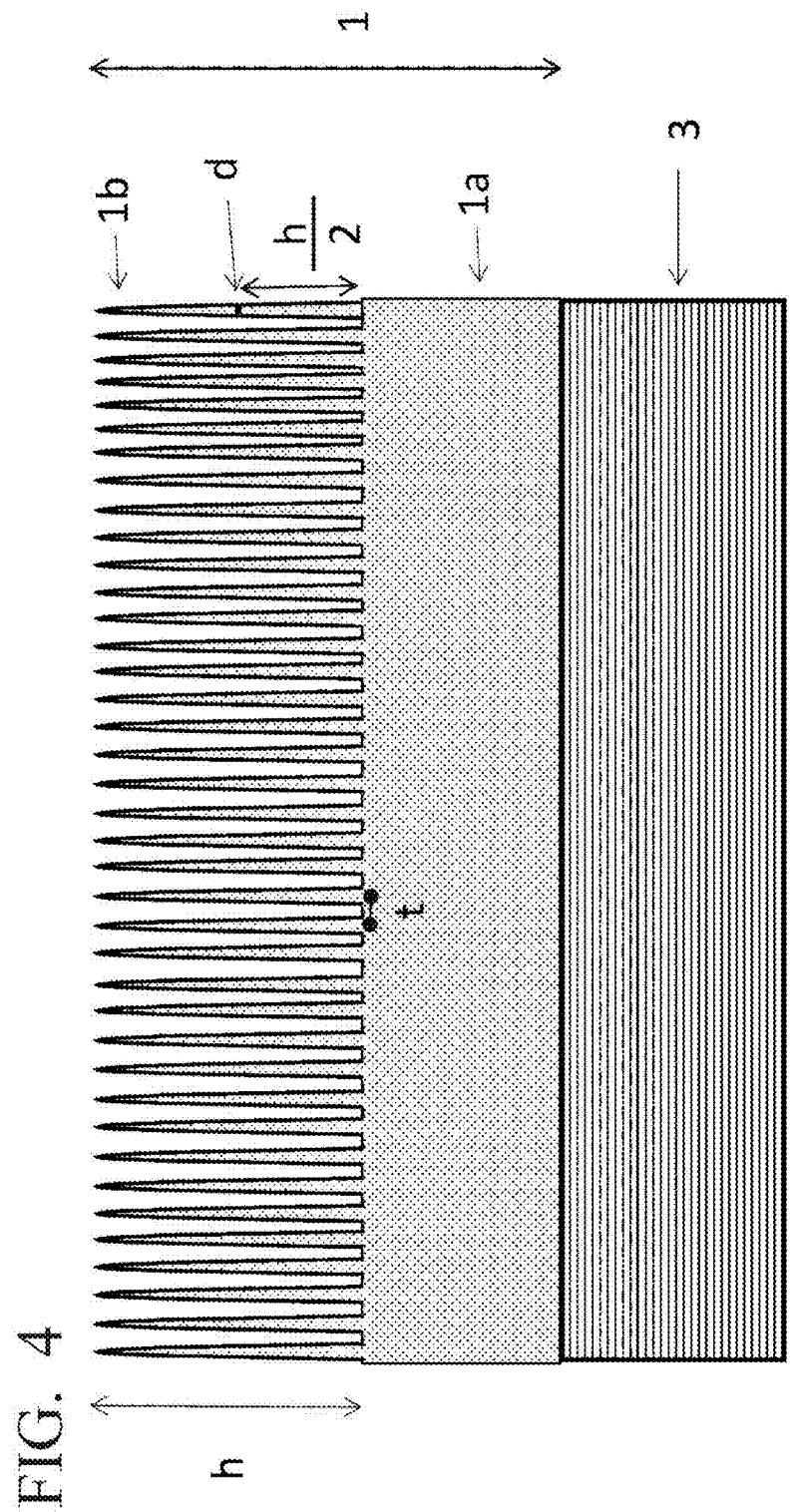
FIG. 4 is a vertical side cross-sectional schematic showing the layer structure of a resin sheet according to the third embodiment of the present invention.

The resin sheet according to a third embodiment of the present invention is one in which the hair-like bodies and base layer (1) and the substrate layer (3) are directly laminated without using the sealant resin sheet (2) indicated in the second embodiment, as shown in FIG. 4. That is, the layer configuration of the resin sheet according to the third embodiment is, from top to bottom, the hair-like bodies and underlayer (1)/the substrate layer (3) and is the layer configuration for the resin sheet according to the second embodiment from which the sealant resin layer has been removed. Here, the hair-like bodies and underlayer are the same as those in the first embodiment and the second embodiment, so explanation thereof is omitted. Meanwhile, the substrate layer (3) in the present embodiment is preferably a layer provided with sufficient adhesion with the underlayer.

Further, in the resin sheet according to the third embodiment, using a thermoplastic resin with excellent adhesion with the underlayer as the substrate layer is preferable. For example, when the underlayer is a urethane-based thermoplastic elastomer, an ABS resin can be used, when the underlayer is a fluorine-based resin, an acrylic resin can be used, and when the underlayer is an olefin-based resin, a hydrogenated styrene-based thermoplastic elastomer can be used. When using a styrene-based resin and a hydrogenated styrene-based thermoplastic elastomer in combination, adding 5-10 parts by mass of the hydrogenated styrene-based thermoplastic elastomer with respect to 90-95 parts by mass of the styrene-based resin is preferred. In this case, by setting the amount of the hydrogenated styrene-based thermoplastic elastomer added to no less than 5 parts by mass, adhesion with the base layer becomes sufficient and the occurrence of interlayer separation can be suppressed, and by setting the amount to no greater than 10 parts by mass, the production costs can be suppressed.

In the same manner as the second embodiment, the abovementioned thermoplastic resins may be alloyed with the substrate layer at any ratio and may further contain any additives so long as this does not inhibit the effects of the present invention. Additives such as water repellents, oil repellents, colorants such as pigments or dyes, lubricants/mold release agents such as silicone oil or alkyl ester-based agents, fibrous reinforcement agents such as glass fibers, granular particles such as talc, clay, or silica or squamous particles such as mica as fillers, low molecular weight-type antistatic agents such as a salt compound of sulfonic acid and an alkali metal or the like or high molecular weight-type antistatic agents such as polyether ester amide or the like, ultraviolet absorbing agents, flame retardants, antibacterial agents, antiviral agents, and thermal stabilizers can be added as the other additives so long as this does not inhibit the effects of the present invention. Further, in the present embodiment, the substrate layer may have a partially crosslinked structure so long as this does not inhibit the effects of the present invention.

As the colorants, there are masterbatches, colored pellets, dry colorants, paste colorants, liquid colorants, inks, etc. and coloring may be performed by kneading with the resin in an extruder. Among these, techniques for coloring by kneading a masterbatch with the resin in an extruder are suitable. As the coloring material used in the colorant, there are carbon black, inorganic pigments, organic pigments, basic dyes, acidic dyes, etc. and among these, carbon black is suitably used. The amount of the colorant added depends on the amount of the colorant added to the hair-like bodies and the underlayer or the thickness of the hair-like bodies and the underlayer, but the final content of the coloring material is preferably no greater than 0.20 mass %, more preferably no greater than 0.18 mass %, and still more preferably no greater than 0.15 mass %. By setting the content to no greater than 0.20 mass %, concerns that the light transmittance will be no greater than a certain level can be reduced.

The color of the substrate layer in the resin sheet of the present invention is not particularly limited if the total light transmittance and the contrast ratio of the resin sheet are within certain ranges.

[Resin Sheet Manufacture]

The manufacturing method for the resin sheet as in the present application is not limited and may be any method, but typically comprises steps for melt-extruding a raw resin and adding the regularly arranged hair-like bodies to at least one surface of the obtained extruded resin sheet.

In the manufacture of a single layer sheet or a multilayer resin sheet, any resin sheet molding method can be used. For example, there are methods for melting and extruding raw resins using a single-screw extruder when the sheet is single layer and multiple single-screw extruders when the sheet is multilayer and obtaining a resin sheet with a T-die. When the sheet is multilayer, a feed block or a multi-manifold die can be used. Moreover, the layer configurations of the embodiments of the resin sheet of the present application are basically as discussed previously, but beyond these, for example, scrap material generated in a manufacturing process for the resin sheet or molded container of the present invention may be added to the substrate layer and laminated as a further layer so long as degradation of the physical properties, etc. is not observed.

The method for adding the hair-like bodies is not particularly limited and any method known by a person skilled in the art can be used. For example, there are a method for manufacturing using an extrusion molding technique, a method for manufacturing using a roll-to-roll technique, a method for manufacturing using a photolithography technique, a method for manufacturing using a hot pressing technique, a manufacturing method using a pattern roll and a UV curable resin, a method for manufacturing using a 3D printer, a method for covalently bonding with a polymerization reaction after embedding the hair-like bodies in the resin layer, etc.

For example, when using an extrusion molding technique, the resin sheet according to the present invention can be manufactured by extruding a resin sheet with a T-die technique and casting with a transfer roll on which a relief process has been performed and a touch roll so as to add the shapes of hair-like bodies to a surface of the resin sheet.

A roll in which a micro-relief has been applied regularly on a surface thereof with a laser engraving or electrocasting method, an etching method, a mill engraving method, etc. can be used as the transfer roll on which a relief process has been performed. Here, regular means that the relief is in an arranged state that is not random, that is, is arranged in an orderly fashion in one direction or in two directions. The arrangement of the relief in an embodiment can be selected from a grid arrangement arranged vertically and horizontally, a staggered arrangement, etc. As the shape of the relief part, there are, for example, if a concave shape, funnel-shapes (cone, quadrangular pyramid, triangular pyramid, hexagonal pyramid, etc.), semicircles, rectangles (quadrangular prism), etc. As the size thereof, the diameter of the opening of the concavity, the depth of the concavity, and the spacing of the concavity shapes are from micrometers to hundreds of micrometers. The spacing of the hair-like bodies can be adjusted by adjusting the spacing of the concavities on the transfer roll and the height of the hair-like bodies can be adjusted by adjusting the depth of the concavities on the transfer roll, and the tactile sensation can also be adjusted thereby.

At least part of the transfer roll surface is ceramic sprayed and it is preferable that a relief process is performed on the ceramic-sprayed surface. Due to ceramic spraying, the workability of the relief is improved and the resin sheet can be stably released from the transfer roll.

Further, performing a relief process with a high aspect ratio on the transfer roll surface is preferable. For example, the aspect ratio (concavity depth/concavity opening diameter) when working concavity shapes into the transfer roll surface is preferably 1.0-9.0. In performing a high aspect ratio relief process on the transfer roll surface, in comparison with an etching method, a blasting method, a mill engraving method, etc., a laser engraving method or an electrocasting method is suitable when performing fine work in the depth direction and thus is particularly suitably used.

For example, a metal, a ceramic, etc. can be used as the material of the transfer roll. Meanwhile, various materials can be used as the touch roll, for example, a roll made from silicone-based rubber, NBR-based rubber, EPT-based rubber, butyl rubber, chloroprene rubber, or fluorine rubber can be used. In an embodiment, a touch roll with a rubber hardness (JIS K 6253) of 40-100 can be used. Further, a teflon layer may be formed on the surface of the touch roll.

The resin sheet of the present embodiment can be manufactured by using a roll set of the above transfer roll and touch roll.

In certain embodiments, the resin sheet of the present embodiment can be manufactured by adjusting the temperature of the transfer roll to a temperature near the crystal fusion temperature, the glass transition point, or the melting point of the thermoplastic resin (for example, 50-150° C. when using a linear medium density polyethylene) and casting with a pinch pressure between the transfer roll and the touch roll of 30-150 Kgf/cm. The cast resin sheet is taken in at a line speed of 0.5-30 m/minute using a pinch roll, etc.

Further, while the above embodiments were shown specifically, the present invention is not limited thereto.

[Molded Article]

The molded article of the present invention is a molded article using the resin sheet of the present invention. The resin sheet of the present invention can support general molding and, as the molding method, in addition to insert molding and in-mold molding, there are general vacuum molding and pressure molding, and as applications thereof, a method for heating and softening a resin sheet in vacuum and overlaying on (molding to) a surface of an existing molded article by opening under atmospheric pressure, etc., but the molding method is not limited thereto. Further, publicly known sheet heating methods such as radiation heating with an infrared heater or the like, which is non-contact heating, can be adapted as a method to heat and soften a sheet before molding. In vacuum-pressure molding in certain embodiments, for example, a resin sheet is molded on to an existing molded article surface after heating at a surface temperature of 60-220° C. for 20-480 seconds and can be stretched to 1.05-2.50 times depending on the surface shape.

[Article]

The resin sheet to which the hair-like bodies according to the present invention are added to a surface thereof can be applied to a use requiring the good tactile sensation indicated above. For example, the resin sheet of the present invention can be applied to interior materials of automobiles, electronic devices, electronic device cladding, cosmetic containers or cosmetic container members, stationery members, lighting fixture members, houseware members, etc.

As interior materials of automobiles, there are the portions of the automobile interior that hands touch such as the steering wheel, dashboard, levers, and switches. For example, an interior material in which the abovementioned resin sheet is attached to a publicly known instrument panel or pillar could be raised. By pasting the resin sheet, an interior material to which a good tactile sensation has been added can be configured. As the material of the resin sheet to be attached, in consideration of weather resistance and chemical resistance, an olefin-based resin, a vinyl chloride-based resin, or a urethane-based elastomer is preferable. The method for pasting the resin sheet and the interior material together is not particularly limited.

As electronic device cladding, there are smartphone housings, smartphone cases, music player cases, game console housings, digital camera housings, electronic notebook housings, calculator housings, tablet housings, mobile computer housings, keyboards, mice, etc. For example, a game device component in which the resin sheet of the present invention is pasted to a publicly known game device substrate could be raised. By pasting the resin sheet, a game device component to which a good tactile sensation has been added can be configured. As the material of the resin sheet to be attached, an olefin-based resin or a urethane-based elastomer is preferable. The method for pasting the resin sheet and the game device component together is not particularly limited.

As a cosmetic container member, there are containers for face cream, pack cream, foundation, and eyeshadow and, for example, a cosmetic container in which the resin sheet of the present application has been pasted to a lid member of a publicly known container for foundation could be raised. By attaching the resin sheet, a cosmetic container to which a good tactile sensation has been added can be configured. As the material of the resin sheet to be attached, an olefin-based resin or a urethane-based elastomer is preferable. The method for pasting the resin sheet is not particularly limited.

As a stationery member, there are book covers, notebook covers, pen case covers, etc. and, for example, a book cover to which a good tactile sensation and waterproofing has been added could be configured by manufacturing a known book cover using the sheet of the present invention. As the material of the sheet, an olefin-based resin or a urethane-based elastomer is preferable. The method for manufacturing using the resin sheet is not particularly limited.

As lighting fixture members, there are lighting devices for interiors and vehicle interiors and, for example, a lighting device in which the resin sheet of the present invention has been pasted to a cover member of a publicly known LED lighting device could be raised. By pasting the resin sheet, an LED lighting device to which a good tactile sensation and light diffusion has been added can be configured. As the material of the resin sheet to be pasted, an olefin-based resin or a fluorine-based resin is preferable. The method for pasting the resin sheet is not particularly limited.

As houseware members, there are toiletries, indoor mats, sheets for tables, etc. and, for example, a toilet device in which the resin sheet of the present invention has been pasted to the seat member of the toilet device could be raised. By pasting the resin sheet, a toilet device for a toilet seat to which a good tactile sensation has been added can be configured. As the material of the resin sheet to be pasted, an olefin-based resin, a vinyl chloride resin, or a fluorine-based resin is preferable. The method for pasting the resin sheet is not particularly limited.

Furthermore, a hair-like body sheet in which words or a pattern are printed on the surface of the hair-like bodies with a general printing method (an offset printing method, a gravure printing method, a flexographic printing method, a screen printing method, foil stamping, etc.) can be manufactured and applied to the above use. The material of the resin sheet to be printed on is not particularly limited, but it is preferable that the printability with the ink used in printing be considered.

Further, a laminated body in which the resin sheet of the present invention is laminate molded (dry laminate molded or extrusion laminate molded) with a printed article on which words, a pattern, etc. are printed (such as paper or a metal thin film) or a non-woven cloth, etc. can be manufactured, for example, a business card with a tactile sensation can be manufactured by laminate molding to the printing surface of the business card. The material of the resin sheet to be laminated is not particularly limited.

EXAMPLES

The present invention shall be explained in more detail below using examples and comparative examples, but the present invention is not at all limited by the details of the examples, etc.

The raw materials used in the examples, etc. are as follows.

(1) Hair-like Bodies and Underlayer

Linear low density PE (C4) "Neozex 45200" (manufactured by Prime Polymer Co., Ltd.)

TPU (urethane-based elastomer) "ET880: Polyether-based" (manufactured by BASF Japan Ltd.)

Mold release agent masterbatch (MB) "Wax Master V" (manufactured by BASF Japan Ltd.)

Colorant masterbatch (MB) "FPU Master Color 880M50 Black" (carbon black concentration: roughly 10%) (manufactured by FCI Co., Ltd.)

(2) Substrate Layer

ABS "GT-R-61A" (manufactured by Denka Company Limited)

PC "Iupilon KH4210UR" (manufactured by Mitsubishi Engineering-Plastics Corporation)

Colorant masterbatch (MB) "AB-M 98H 845 Black" (carbon black concentration: roughly 25%) (manufactured by Dainichiseika Color & Chemicals Mfg. Co., Ltd.)

The evaluation methods for the various characteristics of the resin sheets and the molded articles to which the resin sheets are vacuum molded manufactured in the examples and comparative examples are as follows.

(1) Light Transmittance Evaluation

The total light transmittance was measured in accordance with the specifications of JIS K 7136-1 using a "Color meter ZE6000" (manufactured by NIPPON DENSHOKU INDUSTRIES Co., LTD). Measurements were made at 10 random locations of the surface having hair-like bodies of a 500 mm width resin sheet, excluding 30 mm from both ends, and the arithmetic mean value thereof used as the total light transmittance measurement value.

If the total light transmittance measurement value is no less than 0.1% and no greater than 20%, it is judged that the resin sheet can be used as an optical presentation skin material.

(2) Evaluation of Underlayer Concealment

The contrast ratio was measured in accordance with the specifications of JIS K 5600 4-1 using a Color meter ZE6000 (manufactured by NIPPON DENSHOKU INDUSTRIES Co., LTD). Specifically, this was measured and calculated using a contrast ratio measurement paper based on a concealment power measurement method specified by JIS K 5600 4-1.

The contrast ratio=(colorimetrically measured Y value at a black part of a concealment test paper/colorimetrically measured Y value at a white part of a concealment test paper)×100[%]

Y value: stimulus value (brightness)

If the contrast ratio measurement value is no less than 70% and no greater than 98%, it is judged that the difference in the color underneath is hidden.

(3) Average height of the hair-like bodies, average length of the hair-like bodies, average diameter of the hair-like bodies, average spacing of the hair-like bodies, and average thickness of the underlayer The height (h) of the hair-like bodies, the average length (L) of the hair-like bodies, the diameter (d) of the hair-like bodies, the spacing (t) of the hair-like bodies, and the thickness of the base layer of the resin sheet were measured using a laser microscope VK-X100 (manufactured by KEYENCE CORPORATION). The measured samples were cross-sectional slices cut from the resin sheets at three random locations with a microtome. The average height of the hair-like bodies was measured by measuring the height of 10 hair-like bodies of each sample and calculating the arithmetic mean value of the 30 measurements. 11 points were plotted at equal spacing from the tip to the center of the root of a hair-like body in a multipoint measurement mode and, taking the total value of the 10 intervals when adjacent plotted points are connected with lines, the length of 10 hair-like bodies was measured for each sample and the arithmetic mean value of the 30 measurements used as the average length of the hair-like bodies. The average diameter of the hair-like bodies was measured by measuring the diameter of 10 hair-like bodies of each sample at mid-height (h/2) and calculating the arithmetic mean value of the 30 measurements. The average spacing of the hair-like bodies was measured by measuring the distance from the center of the root of one hair-like body to the center of the root of a neighboring hair-like body at 10 locations of each sample and calculating the arithmetic mean value of the 30 measurements. The average thickness of the underlayer was measured by measuring the thickness from the roots of the hair-like bodies to the other layer interface at 10 locations of each sample and calculating the arithmetic mean value of the 30 measurements.

(4) Good tactile sensation sensory evaluation

A sensory evaluation of the good tactile sensation was performed by having a total of 30 people, 15 men and 15 women, touch the resin sheets. When touching the surfaces of the resin sheets, whether comfortableness was felt was judged with "○" and "x" and when judged with "○", the resin sheet was evaluated with a specific texture such as moistness, softness, or fluffiness. When evaluated with the same texture by no less than 80% of the evaluators, the resin sheet was evaluated as having that texture. Further, whether the same texture was also maintained on the surface of the molded articles which were vacuum-molded using the resin sheets was evaluated.

(5) Comprehensive Evaluation

As a comprehensive evaluation, the samples that satisfied all of the evaluation standards described in (1) to (4) above were evaluated as "○" and those that did not satisfy one of these were evaluated as "x".

Examples 1 and 2

Single layer resin sheets having the raised shapes indicated in Table 1 on one surface, the compositions shown in Table 1, and a thickness of 500 mm were obtained by streaming a dry blend of a resin for the hair-like bodies and the underlayer and a colorant from a 65 mm single-screw extruder, casting a one-layer resin sheet extruded with a T-die method using a metal transfer roll on which a relief process had been performed with chromium oxide spraying and a laser engraving method and which was adjusted to 50-150° C. and a silicone-based rubber touch roll having a rubber hardness of 70 and which was adjusted to 10-90° C., and taking the sheet in at a line speed of 2-15 m/minute using a pinch roll.

Examples 3-7 and Comparative Examples 1-4

Two-layer resin sheets having the raised shapes indicated in Table 1 on one surface, the compositions shown in Table 1, and a thickness of 500 mm were obtained by streaming a dry blend of a resin for the hair-like bodies and the underlayer, a mold release agent, and a colorant from a 40 mm single-screw extruder, streaming a dry blend of a resin for the substrate layer and a colorant from a 65 mm single-screw extruder, casting a resin sheet extruded with a T-die method using a metal transfer roll on which a relief process had been performed with chromium oxide spraying and a laser engraving method and which was adjusted to 50-150° C. and a silicone-based rubber touch roll having a rubber hardness of 70 and which was adjusted to 10-90° C., and taking the sheet in at a line speed of 2-15 m/minute using a pinch roll.

Evaluative testing of the characteristics was performed using the resin sheets obtained in the examples and comparative examples and the results are shown in Table 1.

TABLE 1

| | | HAIRLIKE BODIES AND UNDERLAYER | | | | HAIRLIKE BODIES | | |
|---|---|---|---|---|---|---|---|---|
| | | | | MOLD RELEASE AGENT MB | COLOR-ANT MB | AVERAGE HEIGHT (μm) | AVERAGE DIAMETER (μm) | AVERAGE SPACING (μm) |
| | | LLDPE | TPU | | | | | |
| Example 1 | Composition | 100 | — | — | 1 wt. % | 40 | 30 | 60 |
| | Thickness (μm) | | | 400 | | | | |
| Example 2 | Composition | 100 | — | — | 1 wt. % | 200 | 15 | 40 |
| | Thickness (μm) | | | 500 | | | | |
| Example 3 | Composition | — | 95 | 5 | 1 wt. % | 200 | 15 | 40 |
| | Thickness (μm) | | | 80 | | | | |
| Example 4 | Composition | — | 95 | 5 | 1 wt. % | 150 | 25 | 50 |
| | Thickness (μm) | | | 80 | | | | |

TABLE 1-continued

| Example | | | | | | | | |
|---|---|---|---|---|---|---|---|---|
| Example 5 | Composition<br>Thickness (μm) | — | 95 | 5<br>80 | 1 wt. % | 150 | 25 | 50 |
| Example 6 | Composition<br>Thickness (μm) | — | 95 | 5<br>80 | 1 wt. % | 80 | 35 | 60 |
| Example 7 | Composition<br>Thickness (μm) | — | 95 | 5<br>80 | 10 wt. % | 100 | 30 | 60 |
| Comparative Example 1 | Composition<br>Thickness (μm) | — | 95 | 5<br>80 | 1 wt. % | 150 | 25 | 50 |
| Comparative Example 2 | Composition<br>Thickness (μm) | — | 95 | 5<br>80 | 1 wt. % | 200 | 25 | 50 |
| Comparative Example 3 | Composition<br>Thickness (μm) | — | 95 | 5<br>80 | 1 wt. % | 250 | 15 | 50 |
| Comparative Example 4 | Composition<br>Thickness (μm) | — | 95 | 5<br>80 | 1 wt. % | 20 | 35 | 60 |

| | | SUBSTRATE LAYER | | | TOTAL THICKNESS (μm) | TOTAL LIGHT TRANSMISSIVITY (%) | CONTRACT RATIO (%) | TACTILITY | COMPREHENSIVE EVALUATION |
|---|---|---|---|---|---|---|---|---|---|
| | | ABS | PC | COLORANT MB | | | | | |
| Example 1 | Composition<br>Thickness (μm) | — | —<br>— | — | 400 | 18 | 87.1 | ○ | ○ |
| Example 2 | Composition<br>Thickness (μm) | — | —<br>— | — | 500 | 13 | 94.2 | ○ | ○ |
| Example 3 | Composition<br>Thickness (μm) | 100 | —<br>320 | 0.2 wt. % | 400 | 10 | 95.1 | ○ | ○ |
| Example 4 | Composition<br>Thickness (μm) | 100 | —<br>320 | 0.1 wt. % | 400 | 15 | 82.3 | ○ | ○ |
| Example 5 | Composition<br>Thickness (μm) | — | 100<br>320 | 0.4 wt. % | 400 | 2 | 97.1 | ○ | ○ |
| Example 6 | Composition<br>Thickness (μm) | — | 100<br>320 | 0.2 wt. % | 400 | 14 | 90.7 | ○ | ○ |
| Example 7 | Composition<br>Thickness (μm) | — | 100<br>380 | — | 400 | 1 | 97.5 | ○ | ○ |
| Comparative Example 1 | Composition<br>Thickness (μm) | — | 100<br>320 | — | 400 | 85 | 45.2 | ○ | x |
| Comparative Example 2 | Composition<br>Thickness (μm) | 100 | —<br>320 | — | 400 | 43 | 60.8 | ○ | x |
| Comparative Example 3 | Composition<br>Thickness (μm) | 100 | —<br>320 | 1 wt. % | 400 | 0 | 99.8 | ○ | x |
| Comparative Example 4 | Composition<br>Thickness (μm) | 100 | —<br>320 | 0.3 wt. % | 400 | 6 | 96.5 | x | x |

The following is clear from the results shown in Table 1.

Results satisfying the evaluation standards pertaining to good tactile sensation were obtained with the resin sheets of Examples 1-7 and Comparative Examples 1-3. In contrast, results satisfying the evaluation standards pertaining to good tactile sensation were not obtained by the resin sheet of Comparative Example 4.

Results satisfying the evaluation standards pertaining to total light transmittance and contrast ratio were obtained with the resin sheets of Examples 1-7 and Comparative Example 4. In contrast, both the total light transmittance and the contrast ratio were outside the ranges of the present invention in the resin sheets of Comparative Examples 1-3 and results satisfying the evaluation standards were not obtained.

The present invention was explained above using various embodiments, but it need not be mentioned that the technical scope of the present invention is not limited to the scope described in the above embodiments. It is clear to a person skilled in the art that it is possible to add various modifications or improvements to the above embodiments. Further, it is clear from the recitations of the patent claims that aspects in which such modifications or improvements are added are included in the technical scope of the present invention.

REFERENCE SIGNS LIST

1 Hair-like bodies and underlayer
1a Underlayer
1b Hair-like bodies
d Diameter of the hair-like bodies
h Height of the hair-like bodies
t Spacing of the hair-like bodies
Sealant resin layer
Substrate layer

The invention claimed is:

1. A resin sheet comprising hair-like bodies and an underlayer having at least one surface, wherein the hair-like bodies are arranged regularly on the at least one surface of the underlayer, a continuous phase is formed without any structural boundary between the underlayer and the hair-like bodies, the average height of the hair-like bodies is no less than 30 μm and no greater than 500 μm, the total light transmittance of the resin sheet measured in accordance with JIS K 7136-1 is no less than 0.1% and no greater than 20%, and the contrast ratio of the resin sheet measured in accordance with JIS K 5600 4-1 is no less than 70% and no greater than 98%.

2. The resin sheet according to claim 1, wherein the average diameter of the hair-like bodies is no less than 1 μm and no greater than 50 μm and the average spacing of the hair-like bodies is no less than 20 μm and no greater than 200 μm.

3. The resin sheet according to claim 1, wherein the underlayer and the hair-like bodies have a thermoplastic resin as a main component and the thermoplastic resin comprises an olefin-based resin.

4. The resin sheet according to claim 1, wherein the underlayer and the hair-like bodies have a thermoplastic resin as a main component and the thermoplastic resin comprises a urethane-based elastomer.

5. The resin sheet according to claim 1, wherein the resin sheet is a multilayer resin sheet.

6. A molded article formed using the resin sheet according to claim 1.

7. The molded article according to claim 6, wherein the molded article is vacuum-pressure molded on a surface of an automobile interior member, an electronic device, an electronic device cladding, a cosmetic container, or a container member.

* * * * *